Patented July 1, 1924.

1,499,390

UNITED STATES PATENT OFFICE.

KENNETH J. MATHESON, OF WASHINGTON, DISTRICT OF COLUMBIA, DEDICATED, BY MESNE ASSIGNMENTS, TO THE PEOPLE OF THE UNITED STATES OF AMERICA.

PROCESS OF MANUFACTURING SWISS CHEESE.

No Drawing.   Application filed January 30, 1922. Serial No. 532,901.

(FILED UNDER THE ACT OF MARCH 3, 1883, 22 STAT. L., 625.)

*To all whom it may concern:*

Be it known that I, KENNETH J. MATHESON, a citizen of the United States of America, and an employee of the Department of Agriculture of the United States of America, residing at Washington, District of Columbia, have invented a new and useful Improvement in the Processes of Manufacturing Swiss Cheese, of which the following is a specification.

This application is made under the act of March 3, 1883, chapter 143 (22 Stat., 625) and the invention herein described and claimed may be used by the Government of the United States, its officers and employees, and by any person in the United States either in public or private work without payment to me of any royalty thereon. I hereby dedicate the same to the free use of the Government and the people of the United States.

My invention relates essentially to the new step in the conventional methods of manufacturing Swiss cheese consisting in subjecting the milk from which the cheese is to be made to centrifugal action after the preliminary warming of the milk. In the manufacturing of Swiss cheese, it has been the practice to obtain milk, clean, sweet, and free from any taint. The milk is run into large kettles of about 3,000 pounds capacity, and warmed to a temperature of approximately 95 degrees F., then two cultures are added. The first of these cultures is characterized by its ability to develop a high percentage of lactic acid, and to stand the high temperature employed in the subsequent cooking of the curd. The second culture is employed for the purpose of producing the eyes and characteristic Swiss cheese flavor. The proper quantities of these cultures are then added. Usually one-half per cent of bulgaricus and approximately one c. c. of the eye culture is added to every 10 pounds of milk. After the introduction of these cultures, about 110 c. c. of rennet extract is added to each batch of milk. Most of the manufacturers of Swiss cheese do not use pure cultures, but trust to the hit-or-miss method of having sufficient natural inoculation of these organisms in their homemade rennet, which is always subject to more or less contamination. The milk is set for about 30 minutes, then coagulation takes place and the curd is cut. The curd is cut by means of a harp in both directions, after which it is stirred for about five minutes. By means of a scoop the larger pieces of curd are broken. The stirring is then continued by a harp until the curd particles are just a little larger than wheat kernels or about the size of hemp seeds. From 20 to 45 minutes from the first cutting steam heat is applied which is continued until the temperature of the mixture is brought up to approximately 128 to 130 degrees F. It requires about thirty minutes to bring the heat to this point. During the heating process, and from ten to twenty minutes after said temperature has been reached, active stirring with a whip stirrer is continued until the curd is ready for dipping. The curd is then dipped by means of a linen cloth of open mesh, which is used as a sieve, and the entire contents of the kettle are removed at one dipping, if possible. The curd is then conveyed by suitable mechanical means to the hoops where it is deposited and pressed to give form to the cheese. The curd in the hoop is at first turned at frequent intervals, and the cloth changed. Possibly five or six turnings are required for the cheese for the first several hours, after it is placed in the hoop. It is then pressed for twenty-four hours. The newly-made cheese is then placed into a salt tank for two or three days in order to form a rind. The temperature of the brine tank should be about 56 degrees F. After remaining in the brine tank for the above period, the cheese is placed in the cold room at about the same temperature for about two or three weeks, after which it is carried to the warm room, which has a temperature of from 68 to 72 degrees F., where the eyes of the cheese develop. When the eyes have reached a desired stage, the cheese is carried to the cold room again for the flavor and texture of the cheese to develop. During this period, the cheese which are placed on the shelves are turned, washed and salted every other day. The cheese remains in the curing room for from three to four months.

The improved process for the manufacture of Swiss cheese consists essentially as follows:

All the milk is first warmed to approximately 90 degrees F., and then is sent through a centrifuge. If the milk has been sent through a separator, the cream and skim milk are mixed together, and suitable adjustments made for a slight excess of fat loss occuring in the whey as a result of the above treatment. Treatment of the milk by running it through a centrifuge breaks up the clusters of fat globules, removes the dirt and some of the cellular elements of the milk, and, in short, changes the nature of milk in such a way as to render the milk in a most suitable condition for the manufacture of Swiss cheese. The explanation of this phenomenon is not clear at the present time. The milk is then heated to 95 degrees F., or thereabouts, and suitable amounts of the bulgaricus and eye culture added. Providing there is considerable milk to undergo this treatment, sometimes it is advisable to cool the milk immediately after centrifuging in order to guard against overripening. The milk, if cooled, is now heated to approximately 95 degrees F. The milk is then stirred until practically all the foam has disappeared. Providing pure cultures have been used, about 110 c. c. of commercial liquid rennet is now added. If home-made rennet is used the ripening organisms are supposed to be conveyed to the milk through this medium. The milk coagulates in a short period and it is then cut both ways by a harp and the size of the curd particles gradually reduced to about the size of a hemp seed. After an intervening period of possibly thirty minutes the curd is gradually heated to about 128–130 degrees F. Stirring of the curd takes place at appropriate periods from the time of cutting until the curd is removed from the kettle. The curd is then removed from the Swiss kettle by means of a linen cloth used as a seine and placed in a hoop for pressing. During the first several hours the cloths surrounding the cheese are frequently changed. The curd is then subjected to a pressure of twenty-four hours.

After an intervening day in the cold room, the cheese is placed in a salt brine for two or three days, and then left in a cold room at a temperature of 56 degrees F. for possibly three weeks. The cheese is then carried to the warm room which is held at a temperature of about 72 degrees F., until the eyes of the cheese have reached the proper stage of development. They are again returned to the cold room. During the three to five months sojourn in the curing process the cheese are turned and salted every other day and certain fermentations take place resulting in the development of eyes and textural and flavor changes.

"Eyes" as the term is used herein are those large round holes in the mass of Swiss cheese often varying in size from that of a cherry to that of a quarter of a dollar that are so very essential in a fancy Swiss cheese.

I do not limit myself to the exact process described, as variations may occur therefrom without departing from my invention, the spirit of which is commensurate with my claim.

Having described my invention what I claim as new and what is desired to be secured by United States Letters Patent is:

In the manufacture of Swiss cheese the step of passing milk, after preliminary warming, through a separator, and subsequently reincorporating the separated cream and skim milk.

KENNETH J. MATHESON.